United States Patent
MacKenzie et al.

(10) Patent No.: US 10,230,109 B1
(45) Date of Patent: *Mar. 12, 2019

(54) ELECTROLYTIC DOPING OF NON-ELECTROLYTE LAYERS IN PRINTED BATTERIES

(71) Applicant: Imprint Energy, Inc., Alameda, CA (US)

(72) Inventors: John Devin MacKenzie, Lafayette, CA (US); Christine Chihfan Ho, Fremont, CA (US); Karthik Yogeeswaran, San Francisco, CA (US); Po-Jen Cheng, El Cerrito, CA (US)

(73) Assignee: Imprint Energy, Inc., Alameda, CA (US)

( * ) Notice: Subject to any disclaimer, the term of this patent is extended or adjusted under 35 U.S.C. 154(b) by 357 days.

This patent is subject to a terminal disclaimer.

(21) Appl. No.: 15/051,497

(22) Filed: Feb. 23, 2016

Related U.S. Application Data

(63) Continuation of application No. 13/844,221, filed on Mar. 15, 2013, now Pat. No. 9,276,292.

(51) Int. Cl.
*H01M 4/62* (2006.01)
*H01M 4/131* (2010.01)
(Continued)

(52) U.S. Cl.
CPC .......... *H01M 4/62* (2013.01); *H01M 4/0402* (2013.01); *H01M 4/131* (2013.01); *H01M 4/134* (2013.01); *H01M 4/1391* (2013.01); *H01M 4/1395* (2013.01); *H01M 4/42* (2013.01); *H01M 4/502* (2013.01); *H01M 10/054* (2013.01);
(Continued)

(58) Field of Classification Search
CPC ........ H01M 4/62; H01M 4/131; H01M 4/134; H01M 4/50; H01M 4/04; H01M 10/0565; H01M 10/0585
See application file for complete search history.

(56) References Cited

U.S. PATENT DOCUMENTS 4,461,816 A 7/1984 Leribaux
4,585,715 A 4/1986 Marple
(Continued)

FOREIGN PATENT DOCUMENTS

EP 1995817 A1 11/2008
EP 2262037 B1 8/2014
(Continued)

OTHER PUBLICATIONS

US 9,053,855, 06/2015, Wright et al. (withdrawn)
(Continued)

*Primary Examiner* — Kenneth J Douyette
(74) *Attorney, Agent, or Firm* — Andrew D. Fortney; Central California IP Group, P.C.

(57) ABSTRACT

An electrical or electrochemical cell, including a cathode layer, an electrolyte layer, and an anode layer is disclosed. The cathode layer includes a first material providing a cathodic electric transport, charge storage or redox function. The electrolyte layer includes a polymer, a first electrolyte salt, and/or an ionic liquid. The anode layer includes a second material providing an anodic electric transport, charge storage or redox function. At least one of the cathode and anode layers includes the ionic liquid, a second electrolyte salt, and/or a transport-enhancing additive.

23 Claims, 11 Drawing Sheets

(51) Int. Cl.
*H01M 4/134* (2010.01)
*H01M 10/0565* (2010.01)
*H01M 10/0585* (2010.01)
*H01M 10/054* (2010.01)
*H01M 4/50* (2010.01)
*H01M 4/42* (2006.01)
*H01M 4/1391* (2010.01)
*H01M 4/1395* (2010.01)
*H01M 4/04* (2006.01)
*H01M 4/02* (2006.01)

(52) U.S. Cl.
CPC ... *H01M 10/0565* (2013.01); *H01M 10/0585* (2013.01); *H01M 2004/027* (2013.01); *H01M 2004/028* (2013.01)

(56) References Cited

U.S. PATENT DOCUMENTS

| | | |
|---|---|---|
| 4,714,665 A | 12/1987 | Siegel et al. |
| 5,443,601 A | 8/1995 | Doeff et al. |
| 5,731,104 A | 3/1998 | Ventura et al. |
| 7,316,866 B2 | 1/2008 | Yong et al. |
| 7,449,033 B2 | 11/2008 | Ward et al. |
| 7,494,743 B2 | 2/2009 | Hirose et al. |
| 7,579,112 B2 | 8/2009 | Chiang et al. |
| 7,842,420 B2 | 11/2010 | Wixom et al. |
| 7,943,254 B2 | 5/2011 | Hirose et al. |
| 7,968,248 B2 | 6/2011 | Liu et al. |
| 7,989,110 B2 | 8/2011 | Cavaille et al. |
| 8,173,299 B2 | 5/2012 | Hirose et al. |
| 8,187,753 B2 | 5/2012 | Wixom et al. |
| 8,236,446 B2 | 8/2012 | Lu |
| 9,076,589 B2 | 7/2015 | Wright et al. |
| 9,397,341 B2 | 7/2016 | Lockett et al. |
| 9,416,290 B2 | 8/2016 | Lockett et al. |
| 9,520,598 B2 | 12/2016 | Lockett et al. |
| 2002/0102465 A1 | 8/2002 | Chen et al. |
| 2004/0191617 A1 | 9/2004 | Visco et al. |
| 2006/0210873 A1 | 9/2006 | Hollenkamp et al. |
| 2006/0216586 A1 | 9/2006 | Tucholski |
| 2009/0246625 A1 | 10/2009 | Lu |
| 2010/0216031 A1 | 8/2010 | Machida |
| 2010/0229950 A1 | 9/2010 | Kuang et al. |
| 2013/0280579 A1 | 10/2013 | Wright et al. |
| 2014/0059820 A1 | 3/2014 | Wright et al. |
| 2014/0183421 A1 | 7/2014 | Lockett et al. |
| 2016/0344062 A1 | 11/2016 | Wright et al. |

FOREIGN PATENT DOCUMENTS

| | | |
|---|---|---|
| JP | 52111625 A | 9/1977 |
| WO | 2005114770 A1 | 12/2005 |
| WO | 2012037171 A2 | 3/2012 |
| WO | 2012042004 A1 | 4/2012 |
| WO | 2014014758 A2 | 1/2014 |
| WO | 2014059127 A1 | 4/2014 |
| WO | 2014106088 A1 | 7/2014 |
| WO | 2015009867 A1 | 1/2015 |

OTHER PUBLICATIONS

Christine Chihfan Ho; "Dispenser Printed Zinc Microbattery With an Ionic Liquid Gel Electrolyte"; A Dissertation submitted for Doctor of Philosophy in Engineering; University of California, Berkeley, CA; Fall 2010; 205 pgs.

C.C. Ho et.al.; "Direct Write Dispenser Printing of a Zinc Microbattery With an Ionic Liquid Gel Electrolyte"; Journal of Micromechanics and Microengineering; Sep. 14, 2010; IOP Publishing; UK and the USA; 9 pgs.

Kenneth R. Seddon et al.; "Influence of Chloride, Water, and Organic Solvents on the Physical Properties of Ionic Liquids"; Pure and Applied Chemistry; 2000; pp. 2275-2287; vol. 72, No. 12; IUPAC, Research Triangle Park, NC.

Maciej Galinski et al.; "Ionic Liquids as Electrolytes"; Electrochimica Acta; 2006; pp. 5567-5580; Elsevier; www.sciencedirect.com.

ELECTROLYTIC DOPING OF NON-ELECTROLYTE LAYERS IN PRINTED BATTERIES

RELATED APPLICATIONS

This application is a continuation of U.S. patent application Ser. No. 13/844,221, filed Mar. 15, 2013, now U.S. Pat. No. 9,276,292, which is incorporated herein by reference in its entirety.

FIELD OF THE INVENTION

This invention relates generally to electrodes and current collectors for electrochemical cells, and, more specifically, to improved polymer electrolyte chemistries and methods of making cells containing these layers that can be used with devices as single-use or rechargeable power sources.

BACKGROUND OF THE INVENTION

Description of Related Art

The reduction of electronic device form factors and their power demands have made it possible to realize new devices that are thin, compact, curved and flexible. The evolution of portable devices can be in part attributed to the combination of the advancements in battery electrode materials and their compatibility with electrolyte materials. For example, the development of more effective high energy density lithium and lithium-ion electrode materials has enabled portable, compact, high capacity batteries, while the introduction of lithium and lithium-ion solid polymer and gel electrolytes has relaxed the battery's requirement for rigid and hard packaging, spurring the wide-spread adoption of thinner batteries, hermetically sealed with plastic and foil materials in pouch constructions. In addition to performance and form factor benefits, the use of solid-state, polymer, and gel electrolytes have introduced additional improvements in battery manufacturability, cost, and inherent safety. Thus, considerable efforts have been dedicated to solid-state, polymer, and gel electrolyte development as well as coating and printing fabrication approaches to deposit these electrolytes and the other cell layers.

The demand for thin, miniature, and low cost batteries has been propelled by the increased ubiquity of low power sensors, wireless devices, smart cards, wearable devices such as Bluetooth audio devices, headsets, fitness monitors, health monitors and other devices worn on the human body. Also, there is continuing interest in developing thinner phones, tablets, e-readers, and laptops as well as flexible devices such as flexible OLED displays, flexible memories, and flexible photovoltaic modules, which may be incorporated in curved or flexible integrated devices. Even in larger capacity formats, such as in vehicles or airborne applications, thinness, conformability and flexibility can allow for more efficient use of space, greater robustness, and greater safety. Such curved or flexible devices would benefit from thinner, conformable, or flexible batteries that have high energy densities, long storage and operational lifetimes, and cycling capability.

Of the existing battery systems that are being considered for these applications, thin film, lithium polymer, and semi-printed batteries are of interest, though each have shortcomings that have limited their widespread adoption. Vapor deposited thin film lithium and lithium-ion batteries have relatively low energy storage capacities and power capabilities due to materials deposition limitations. Lithium polymer batteries have leveraged the rapid advancements of pouch cell battery manufacturing, but like thin film lithium and lithium-ion batteries, are plagued by stringent hermetic encapsulation requirements due to its sensitivity to contamination or corrosion from the environment, fire, and safety issues. There have been recent developments in printable polymer electrolyte devices that show significant promise for producing high energy density, thin, flexible and safe rechargeable batteries based on multivalent ion chemistries (PCT/US2011/051469), and that can be processed by additive coating and printing processes.

This "Description of the Background" section is provided for background information only. The statements in this "Description of the Background" section are not an admission that the subject matter disclosed in this section constitutes prior art to the present disclosure, and no part of this "Description of the Background" section may be used as an admission that any part of this application, including this section, constitutes prior art to the present disclosure.

Deficiencies of Cell Performance this Invention can Improve

Capacity reduction and capacity fade in batteries can be due to insufficient ionic and ionic transport enhancing species. This is particularly true in battery cell structures including electrolyte-surrounding layers that have significant fractions of materials that may have some significant solubility, porosity, permeability, and/or diffusivity for ionic species critical for electrolytic performance. One such battery cell type is the solid polymer and gel electrolyte ion transport battery, including the lithium polymer battery, which may contain electrodes composed of ceramic or metal particles in a more permeable matrix composed of a polymer material, for example: U.S. Pat. No. 5,296,318 INTERCALATION BATTERY WITH HYBRID POLYMERIC ELECTROLYTE. Of further interest are printed polymer gel-based battery structures such as that disclosed by WO12037171, which describes fully-printed polymer cell constructions and compositions which can include particle and matrix based electrodes and current collectors, and metal salt and ionic liquid mobile species which can redistribute into electrodes, collectors or packaging. This problem can also be aggravated by the use of high ionic conducting binders in electrode formulations, which are used because they can beneficially increase the ion transport, electrochemical reaction kinetics, and utilization in those electrodes, as these promote faster and higher absolute magnitude species redistribution. An example binder material which may promote electrode kinetics, but which is susceptible to redistribution of ionic species, is PVDF-HFP (poly(vinylidene fluoride-co-hexafluoropropene)). Note that this redistribution of species can also cause mechanical issues due to volume and stress redistributions associated with the mass transfer. Specifically, this can mean increases in volume, pressure, or swelling in the electrodes or current collectors. As ions from the electrolyte redistribute to the electrolyte-surrounding layers, it also creates a mass loss in the electrolyte, which can manifest itself as a volume change and/or high stress state, and induce porosity of the electrolyte. The stress states induced by the mass transfer can result in delaminations, curling or other mechanical problems. The overall transfer properties of the electrolyte can also be significantly degraded due to this phenomenon.

In these cases where there is a matrix or active component in an electrolyte adjacent layer that has some significant solubility or mass transport capability for the ionic species, ionic transport enhancing species, buffering agent (organic acids, chelating agents, etc.), or solvent species in the electrolyte layer, these species can be lost by the mass transport of those species into the matrix of the electrodes, and from the electrode into the current collector as well via redistribution during processing, migration, or diffusion. This can occur during processing, potentially accelerated during subsequent high temperature drying, curing or forming steps. Redistribution of these species into electrolyte adjacent and electrode adjacent layers can also occur during subsequent printing steps, where a solution or ink that is applied to the electrolyte or electrode layer may dissolve or induce the transport of electrolytic species from the electrolyte or electrodes into the liquid ink, which can contain carriers that may be solvents for the species. Redistribution of the species can also occur during storage and end consumer use of the product due to diffusion in response to concentration gradient distributions, thermal exposures, or the application of an electric field causing ion migration through the battery.

In general, the unwanted redistribution of these materials can result in lower concentrations of these materials in electrolyte or electrode layers, leading to degraded performance due to increases in electrochemical impedance, loss in capacity, and/or loss in high rate-handling capacity. This can happen immediately after processing, or it can lead to performance fade or loss over time and/or use as the species continue to redistribute in the cell structure.

FIG. 1 shows discharge capacity data (1 cm2 active area, 100 microamps constant current charge and discharge) for a series of printed battery samples after different storage periods (room ambient conditions) before testing. The cells were printed in a top cathode structure with ionic permeable cathode matrix materials and ionic permeable current collector binders. Electrolyte and cathode formulations followed the procedure disclosed in WO12037171, and the top cathode current collector was composed of a mixture of graphite, acetylene black, and a polyvinylidene fluoride-based copolymer. The electrolyte formulation can demonstrate ionic conductivities over 10^-3 Ohm-cm in impedance measurements. For the completed cells in this experiment, significant capacity fade was observed with longer storage time intervals out to ~1 month storage time. The electrolyte, cathode, and current collector contained ionic liquid and metal salt-solvating polymers. The cathode electrode and the current collector had a composite structure with continuous percolation paths of polymer that interconnect and that would allow ionic liquid and metal salt molecular and ionic drift, or migration or diffusion through their structures.

After the 1 month storage and test cycle, cells from this fabrication lot were then exposed to ionic liquid and ionic liquid+zinc salt mixtures, such that ionic species could diffuse through the current collector and cathode and into the cathode and electrolyte layers. This resulted in a significant increase in capacity for the exposed samples versus control, non-exposed samples (see FIG. 2 and FIG. 3). This improvement in measured capacity is consistent with diffusion of ionic liquid and metal salt through the current collector and cathode into the electrolyte layer, where it enhances ionic conductivity in the cathode and electrolyte and increases effective cell capacity. Some of the reduction in capacity observed over time in FIG. 1 may be associated with ionic transport of species out of the electrolyte and electrolyte cathode interfacial areas into the current collector, resulting in reduced ionic conductivity in these layers.

Additional experiments with subsequent printed layers of printed conductors and electrolytes show the specific interactions between an ionic liquid+metal+salt+PVDF-HFP layer and a conductive particle+PVDF-HFP layer. Samples were prepared by stencil printing a conductive pattern of PVDF-HFP+Ni particle ink, drying the printed ink, and subsequently stencil printing and drying an ionic liquid+metal+salt+PVDF-HFP layer on top of the Ni particle-containing ink pattern in the following configuration and measuring the end-to-end resistance. This experiment showed that the resistance of the nickel layer increased significantly immediately after the electrolyte was printed on top of the nickel current collector bar, and that the conductivity continued to rise over time, on the scale of hours, after the electrolyte was dried, indicating that liquid phase redistribution and longer term, solid phase diffusion effects can be active when these types of electrolyte interact with adjacent layers. Additional experiments with exposure of particle+binder conductors to neat ionic liquid showed a similar resistance increase. Further experiments with methacrylate binder-based nickel particle conductors, which show little tendency to swell with exposure to electrolyte materials, showed substantially reduced resistance changes for printed conductors in contact with ionic liquid. The conductivity loss mechanism is likely dominated by swelling of the binder of the conductive layer with the ionic liquid and/or metal salt from the electrolyte. This swelling of the conductive layer, due to diffusion, drift, migration, or redistribution during deposition of electrically active species out of the electrolyte and/or electrolyte cathode interfacial areas and into the current collector, results in the observed reduction in ionic conductivity.

For the structure 10 in FIG. 4, the components, compositions, and processing conditions are as follows
Printed nickel bar 12 dimensions: 1 cm×8 cm
Printed electrolyte bar 14 dimensions: 1 cm×2.5 cm
Nickel ink: Strem Ni powder+Arkema PVDF-HFP+Sigma Aldrich NMP
Ni Drying: 30 minutes@60° C.
Nickel to binder weight ratios were as follows:
  1. PVDF-HFP:Ni=1:9
  2. PVDF-HFP:Ni=1:12
  3. PVDF-HFP:Ni=1:14
Electrolyte ink: Merck BMIM triflate+zinc triflate+Arkema PVDF-HFP+Sigma Aldrich NMP (following WO2012/037171 A2)
Electrolyte Drying: 2 hrs @ 60° C.

The following table shows end-to-end resistance measurements for the composition variants in the printed Ni/Printed electrolyte experiment versus time after electrolyte layer printing and drying:

| Hours | PVDF-HFP:Ni Ratio by weight 1:9 (ohm) | PVDF-HFP:Ni Ratio by weight 1:12 (ohm) | PVDF-HFP:Ni Ratio by weight 1:14 (ohm) |
| --- | --- | --- | --- |
| 0 | 385 | 186 | 194 |
| 1 | 483 | 300 | 476 |
| 2 | 2625 | 1212 | 1264 |
| 18 | 8118 | 7227 | 735 |
| 21 | 2540000 | 3460000 | 2050000 |
| 138 | Overload | Overload | Overload |

Prior to electrolyte deposition, the resistance of the printed Ni conductors measured end-to-end varied from 23.4 to 24.5 ohms.

SUMMARY OF THE INVENTION

A first aspect of the present invention concerns an electrochemical cell, comprising a cathode layer, an electrolyte layer, and an anode layer. The cathode layer comprises a first material providing a cathodic electric transport, charge storage or redox function. The electrolyte layer comprises a polymer, a first electrolyte salt, and the ionic liquid. The anode layer comprises a second material providing an anodic electric transport, charge storage or redox function. At least one of the cathode layer and the anode layer further comprises the ionic liquid, a second electrolyte salt, and/or a transport-enhancing additive. Each of the cathode layer, electrolyte layer, and anode layer may include the ionic liquid, electrolyte salt and/or transport-enhancing additive in a concentration at or near a saturation concentration. In one example, the "saturation concentration" can mean the concentration beyond which increases in concentration result in the presence of significant quantities of undissolved or separated materials. Alternatively, "saturation concentration" can mean the concentration beyond which no additional beneficial effect of the increased component occurs with an increase in the concentration of that component. In some cases, exceeding concentration limits that results in formation of large or appreciable quantities of separated liquid (e.g., an added ionic liquid, solvent, or ionic liquid-salt mixture) can be detrimental, as this can lead to enhanced dendrite formation in those areas, destabilization of interfaces, delamination, and surface wetting issues. In a further alternative, "saturation concentration" can mean the maximum concentration of a particular component in a given layer under the conditions of manufacture and/or use. In one embodiment, the concentration of the ionic liquid in each of the cathode layer, electrolyte layer, and anode layer is substantially at the saturation concentration.

In some embodiments, the cathode layer comprises the second electrolyte salt, and the anode layer comprises a third electrolyte salt. The first, second and third electrolyte salts may be identical to or different from one or more of the other electrolyte salts. For example, the first, second and third electrolyte salts may each have a common ion (e.g., $Zn^{2+}$ or trifluoromethanesulfonate). The cathode layer and/or anode layer may further include the transport-enhancing additive, which can be a supporting solvent for improving ionic conductivity such as ethylene carbonate, propylene carbonate, etc.

In some embodiments, the electrochemical cell may further comprise a first current collector layer on the cathode layer, and a second current collector layer on the anode layer. The first and second current collector layers generally comprise an identical or different conductive material. In further embodiments, each of the first and second current collector layers further comprises the ionic liquid. In addition, each of the first and second current collector layers may further comprise an identical or different electrolyte salt, and each of the electrolyte salts in the electrochemical cell may have a common ion. The first and/or second current collector layers may further include the transport-enhancing additive. The cathode layer, anode layer and/or the first and/or second current collector layers may further include a desiccation agent such as $SiO_2$ or one or more fillers to improve mechanical stability.

In some embodiments, the ionic liquid content of the electrolyte layer, an electrode layer or a current collector layer may be below the saturation limit and/or the concentration of the ionic liquid in another layer (e.g., the electrolyte layer), relative to the total solid content in the layer or as a ratio to the (primary) polymer content in the layer (e.g., the electrolyte layer or film). In other embodiments, the ionic liquid content of the electrolyte layer, electrode layer or current collector layer may be the same as the concentration of the ionic liquid in another layer (e.g., an electrode layer and/or current collector layer), relative to the total non-impermeable material content or the non-impermeable-to-ionic liquid material ratio in the electrolyte layer, or as a ratio to the (primary) polymer content in the electrode layer(s) or current collector layer(s).

In some embodiments, the electrolyte salt content of the electrolyte layer, an electrode layer or a current collector layer may be below the saturation limit and/or the concentration of the electrolyte salt in another layer (e.g., the electrolyte layer), relative to total the solid content in the layer or as a ratio to the (primary) polymer content in the layer (e.g., the electrolyte layer or film). In other embodiments, the electrolyte salt content of the electrolyte layer, an electrode layer or a current collector layer may be the same as the concentration of the electrolyte salt in another layer (e.g., an electrode layer and/or current collector layer), relative to the total content of materials not impermeable to the electrolyte salt in the electrolyte layer, or as a ratio to the (primary) polymer content in the other layer (e.g., the electrode layer[s] or current collector layer[s]). In some further embodiments, the electrolyte salt content or ionic liquid content in the electrode layer(s) and/or current collector layer(s) may be higher than the corresponding content in the electrolyte layer, to serve as a positive diffusion source of the electrolyte salt or ionic liquid.

Some embodiments may also include one or more solvents, additives, or other materials having ion transport-enhancing properties; one or more buffers or chelating agents in an electrode and/or current collector layer that act as diffusion blockers or diffusion sources for flow of these materials from the electrolyte layer or adjacent electrode or current collector layers.

The first conductor may comprise a conductive compound, conductive carbon, or a combination thereof. The polymer may comprise a polyfluoroalkene, such as a polymer or copolymer of a fluoroalkene of the formula $C_xH_yF_z$, where x is an integer of from 2 to 6, z is an integer of from x to 2x, and y+z is an even integer of from x+2 to 2x. The ionic liquid may comprise an imidazolium salt, pyrrolidinium salt, ammonium salt, pyridinium salt, piperidinium salt, phosphonium salt, or sulfonium salt that is a liquid at ambient or room temperature. The electrolyte salts may release cations selected from the group consisting of zinc ions, aluminum ions, magnesium ions, and yttrium ions, and anions selected from the group consisting of chloride, tetrafluoroborate ($BF_4^-$), trifluoroacetate ($CF_3CO_2^-$), trifluoromethanesulfonate ($CF_3SO_3^-$), hexafluorophosphate ($PF_6^-$), bis(trifluoromethyl-sulfonyl)amide ($NTf_2^-$), and bis(fluorosulfonyl)imide ($N(SO_2F)_2)^-$. The second conductor may comprise an elemental metal or an alloy thereof, a carbon-based material, and/or a conducting polymer.

In a further aspect, the present invention concerns a method of making an electrochemical cell, comprising forming a cathode layer on a substrate, forming an electrolyte layer on the cathode layer, and forming an anode layer on the electrolyte layer. The cathode layer, electrolyte layer, and the anode layer are as described herein. Each of the cathode layer, electrolyte layer, and anode layer may include the ionic liquid and/or the electrolyte salt in a concentration at or near a saturation concentration.

In some embodiments, forming the cathode layer comprises printing an ink comprising the first conductive material or a precursor thereof, drying and/or curing the first conductive material or precursor thereof to form a cathode, and contacting the cathode with the ionic liquid to dope or impregnate the cathode with the ionic liquid. Forming the electrolyte layer may comprise printing an ink comprising the polymer, the first electrolyte salt, and the ionic liquid on the cathode layer, and forming the anode layer may comprise printing an ink comprising the second conductive material or a precursor thereof on the electrolyte layer, drying and/or curing the second conductive material or precursor thereof to form an anode, and contacting the anode with the ionic liquid to dope or impregnate the anode with the ionic liquid. In one embodiment, the cathode layer is printed on a substrate. Alternatively, the anode layer is printed on the substrate, the electrolyte layer may be printed as an electrolyte ink on the anode layer, and the cathode layer is printed on the electrolyte layer.

The method may further comprise forming a first current collector layer on the cathode layer (or vice versa), and forming a second current collector layer on the anode layer (or vice versa). The first and second current collector layers may comprise the same or different conductive material as the other current collector layer and/or the cathode or anode. In further embodiments, each of the first and second current collector layers further comprises the ionic liquid and/or electrolyte salt, and the concentration of the ionic liquid and/or electrolyte salt in each of the cathode layer, electrolyte layer, and anode layer is substantially at the saturation concentration.

In other embodiments, the ionic materials, solvents, ion transport-enhancing additives and/or other beneficial species may be introduced to the cell from an external liquid or solid source. This source could be temporary, such as through immersion in a liquid, or by physical contact with an external source. Alternatively, the source could be a permanent donor layer, such as a layer that forms part of the packaging of the device.

In other embodiments, the ionic materials may be redistributed in the cell structure through the application of one or more electric fields between the electrodes, electrolytes, and/or current collectors. Alternatively, an external donor layer (such as a layer that forms part of the packaging of the device) that does not have a primary function as an electrode or collector of current can be used to apply such an electric field.

DETAILED DESCRIPTION AND EXAMPLES

Various embodiments are illustrated in the context of a printable zinc electrochemical cell, in which divalent ions travel through a gel electrolyte. The skilled artisan will readily appreciate, however, that the materials and methods disclosed herein will have application in a number of other contexts where divalent or monovalent ion transport is applicable or desirable, and that other systems (based on monovalent or divalent ion transport, or other ion transport systems of higher valency) are also suitable for use in the present invention. This invention applies to structures which are deposited on foils, plastic substrates, fabrics (woven and nonwoven), and papers, as well as in cases where underlying and overlying elements have barrier properties to the outflow of cell species. This invention may be particularly useful in cases where these elements are not impermeable to electrolytic species.

In this disclosure, the terms "negative electrode" and "anode" are used interchangeably, and use of one term generally includes the other, but both terms may be used to mean "anode." Likewise, the terms "positive electrode" and "cathode" are used interchangeably, and use of one term generally includes the other, but both terms may be used to mean "cathode."

In this disclosure, the term "current collector" refers to a conductive element in contact with the anode or cathode.

Figure 1:
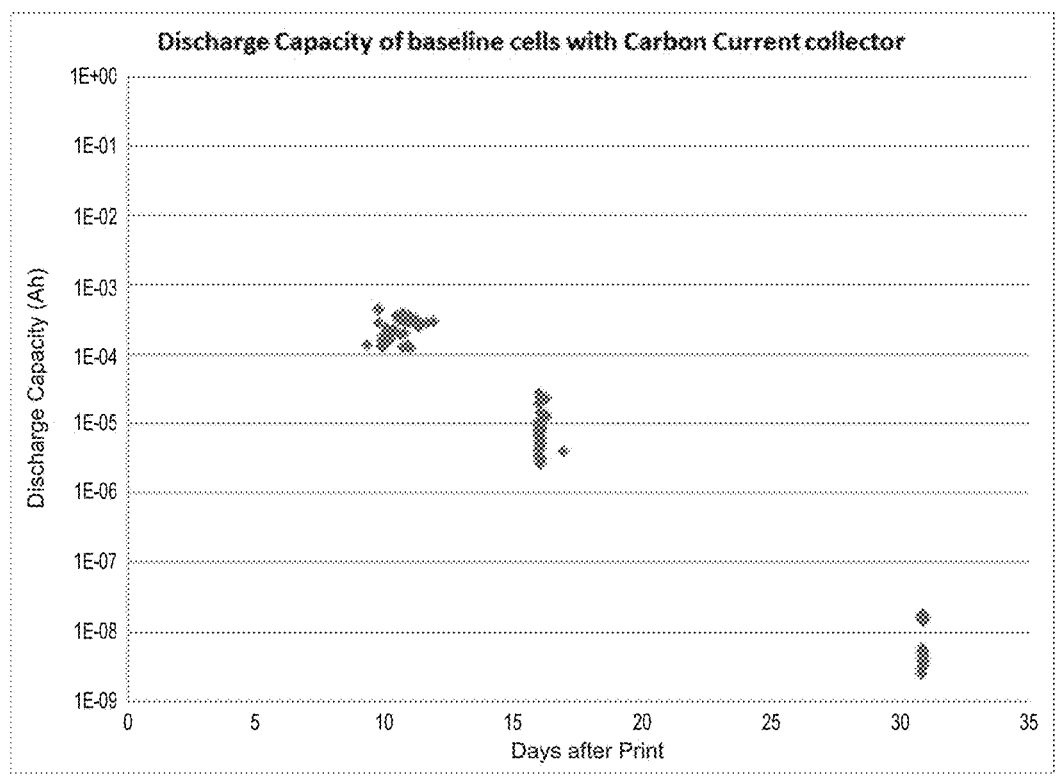
FIG. 1 is a graph showing discharge capacities of printed Zinc/polymer electrolyte/MnO2/C collector cells after various storage intervals in air.
Figure 2:
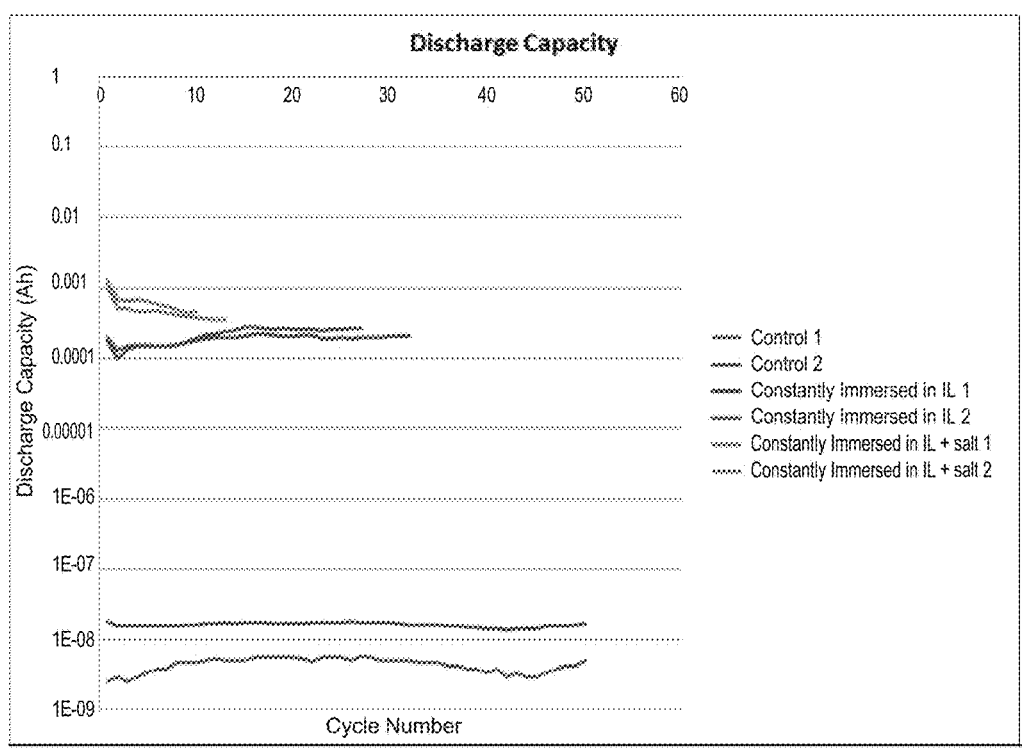
FIG. 2 is a graph showing discharge capacity versus charge/discharge cycles for control cells (no post-fabrication ionic exposure) after the 1 month aging experiment in FIG. 1, and corresponding cells that were exposed to ionic liquid and ionic liquid+zinc metal salt.
Figure 3:
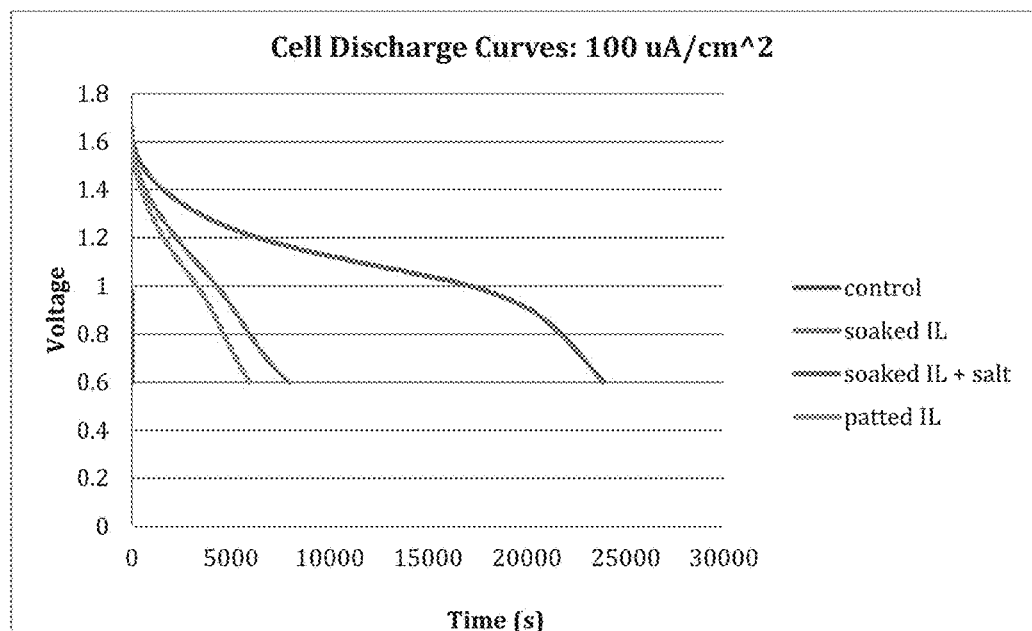
FIG. 3 is a graph showing voltage discharge curves for control cells (no post-fabrication ionic exposure) after the 1 month aging experiment in FIG. 1, and corresponding cells that were exposed to ionic liquid and ionic liquid+zinc metal salt.
Figure 4:
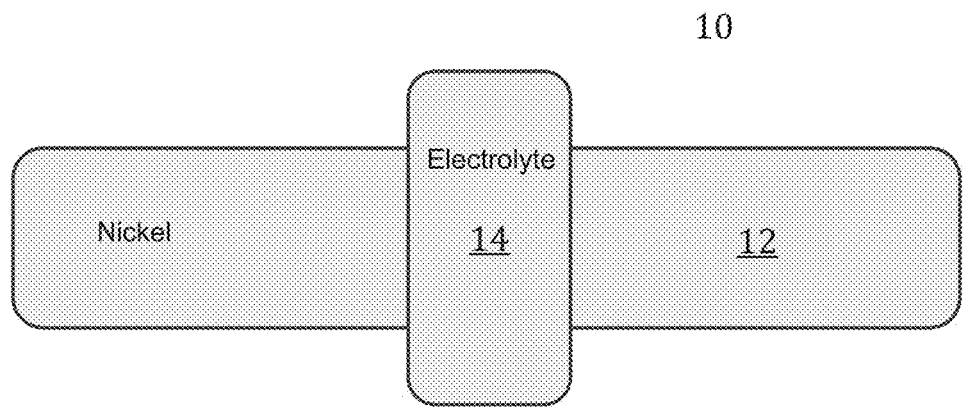
FIG. 4 depicts the structure of an exemplary cell on which experiments were performed to show the specific interactions between an ionic liquid+metal+salt+PVDF-HFP layer and a conductive particle+PVDF-HFP layer.
Figure 5A:
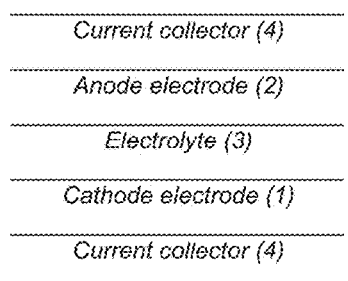
FIGS. 5(A)-(B) respectively show a diagram of the layers in an exemplary cell (FIG. 5(A)) and a photograph of an actual cell (FIG. 5(B)).
Figure 5B:
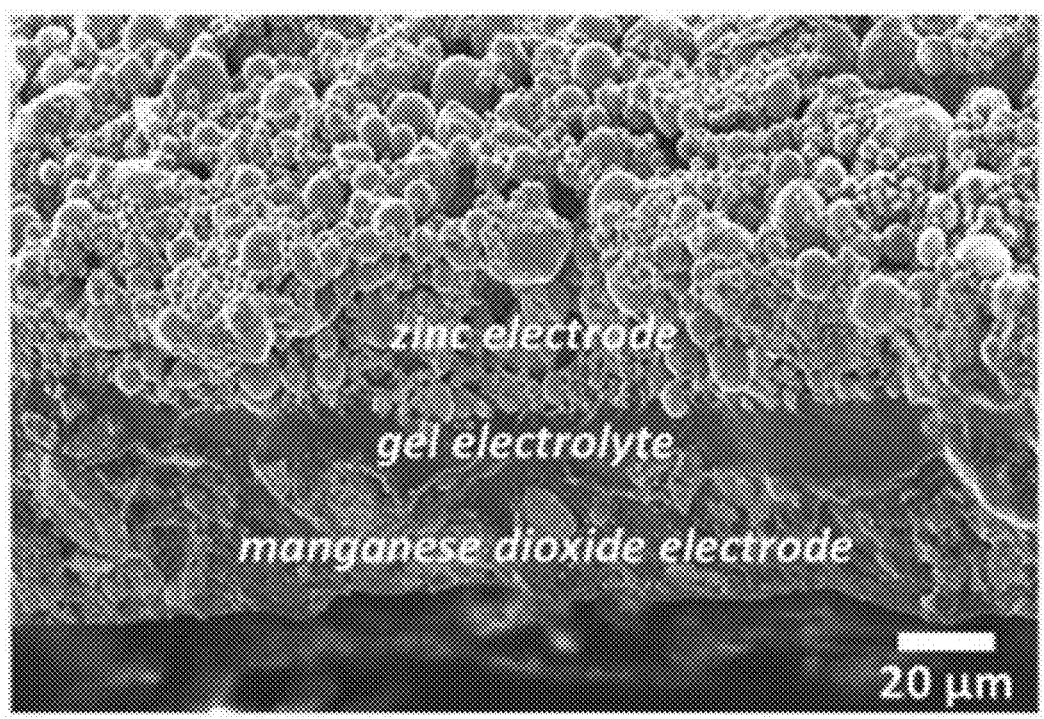

FIG. 5(A) is an exemplary cross-sectional diagram of an electrochemical cell according to an embodiment of the invention. The cell comprises a cathode (1) and anode (2) separated by an electrolyte layer (3). As is also shown in FIG. 1, current collectors (4) may be positioned at the open sides of the anode (2) and cathode (1) to provide proper electrical contact with a load applied to the current collectors. In some cases, it is also possible that an electrode also serves as a current collector, as could be the case with a highly conductive composite electrode or an electrode foil with sufficient conductivity. Conductivity for a current collector or combined current collector and electrode would be <100 ohm/sq preferably <10 ohm/sq, most preferably <1 ohm/sq). It is appreciated that the current collectors (4) are an optional component, and the cell may comprise other configurations in terms of vertical ordering of the stack (i.e., anode on bottom and cathode on top). FIG. 5(B) shows a scanning electron image of a cryogenically-fractured cross section of a printed cell stack following WO2012/037171 A2, which is an example structure to which this invention can be applied. The center darker layer is the electrolyte layer which is sandwiched by a Zn-based anode (top) and an MnO2-based cathode layer (bottom).

Figure 6:
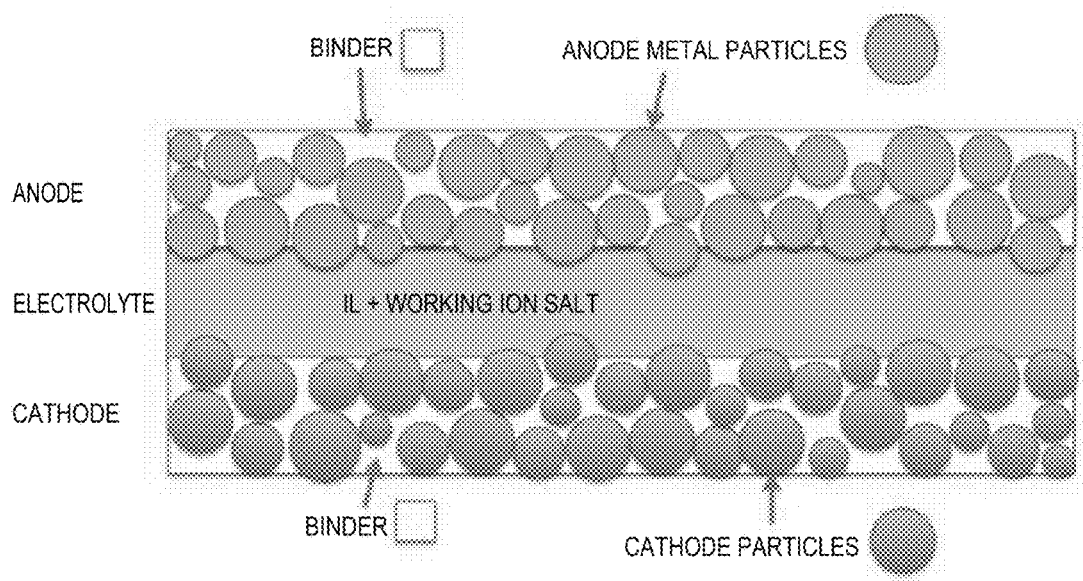
FIG. 6 is a cross-sectional diagram showing an exemplary zinc poly-type cell structure in which only the electrolyte layer is doped with an ionic liquid and working ion salt (e.g., Zn triflate).
Figure 7:
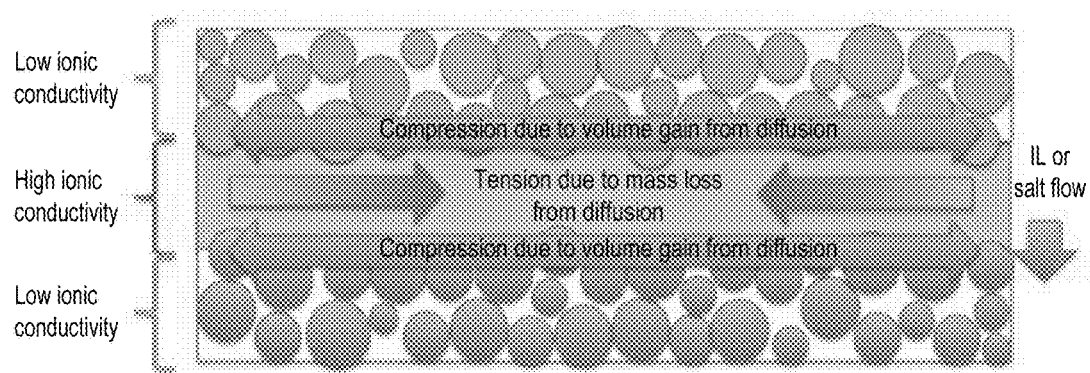
FIG. 7 is a cross-sectional diagram showing stress states due to mass flow from IL or salt diffusion from the electrolyte layer to the adjacent layers in the device.
Figure 8:
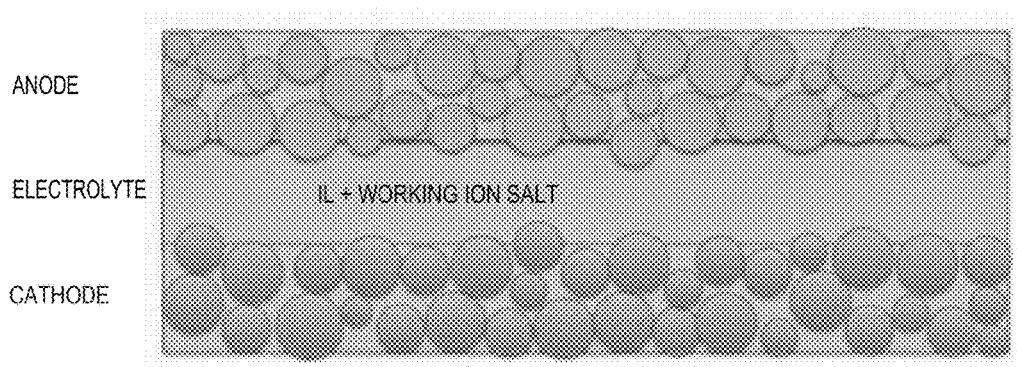
FIG. 8 is a cross-sectional diagram showing a cell structure with a constant ionic liquid and salt doping structure throughout the structure.
Figure 9:
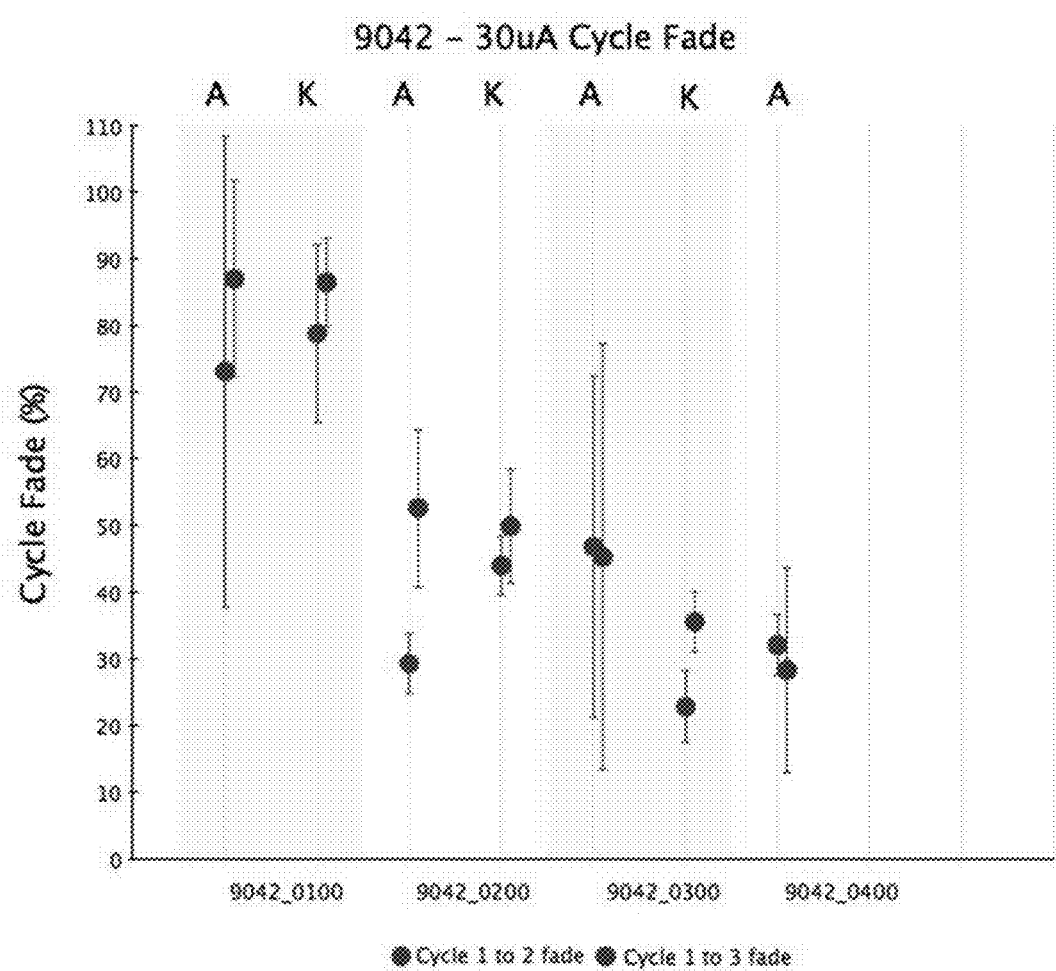
FIG. 9 is a graph showing cycle fade of discharge capacity for printed battery cells with increasing cathode IL and salt doping from left to right.

In FIG. 5(B), it can be clearly seen that the anode and cathode can be considerably thicker than the electrolyte. This particular stack includes an electrolyte with a triflate-based ionic liquid and working metal salt in a PVDF-HFP mixture, a cathode that comprises or consists essentially of a mixture of PVDF-HFP, $MnO_2$ particles and carbon conductive additive, and an anode that comprises or consists essentially of zinc particles in PVDF-HFP. Top current collectors on this stack include conductive carbon, graphite, and Ni in a polymer binder, or a laminated foil (e.g., a conductive metal, alloy or metal compound film on a metal or alloy foil, such as nickel, copper, titanium, aluminum or stainless steel foil). The current collectors are not shown in FIG. 6, but are similar in configuration to the anode layer (e.g., Ni particles in a PVDF-HFP binder) in another exemplary cell. In this particular case, all materials were deposited by sequentially dispensing and drying layers of liquid solutions in the volatile solvent n-methylpyrolidone (NMP). Based on the fact that (i) the electrolyte layer was deposited as a wet layer dissolved in NMP, which is also a solvent for the PVDF-HFP in the cathode layer, and (ii) there was significant thermal processing after the electrolyte was deposited, there is a driving force for transport of ionic liquid (IL) and salt out of the electrolyte layer into the electrodes and collectors, since those other layers had negligible IL or salt concentration as deposited. On the other hand, there was an equivalent solubility in the respective binders as there is in the electrolyte. Thus, it can be concluded that IL and salt diffuses out, drifts, migrates, and/or redistributes from the electrolyte layer during or after processing into the adjacent layers, resulting in an increase in IL and salt concentrations in the other layers, and a reduction in the concentrations of IL and salt in the electrolyte layer. This movement of IL and/or salt may cause short-term effects or be responsible for longer-term shifts in ionic conductivity and battery performance after fabrication.

As stated above, the suppression of transport of the ionic liquid and electrolyte salt out of the electrolyte can help maintain a higher fraction of the electrolyte's starting concentration of ionic liquid, thus stabilizing ionic conductivity-related kinetics changes and capacity loss. Suppressing this ionic liquid and electrolyte salt transport loss may also prevent the formation of porosity in the electrolyte layer and film stresses related to mass loss from the electrolyte layer, which in turn can lead to poor performance, delamination and other losses.

Furthermore, additional experiments showed that printing of doped electrolytes over conductive layers formed from conductive particles including nickel and carbon in PVDF and PVDF-HFP causes a permanent reduction in the conductivity of the underlying conductive layer, while printing non-doped PVDF over these same conductors did not permanently affect the conductivity. This further supports the hypothesis that ionic liquid (IL) and/or electrolyte salt transfer from electrolyte layers into adjacent layers is a reasonable explanation of this behavior. and that the IL and/or electrolyte salt may pass into the binder of the conductive adjacent layer causing the reduced conductivity, possibly through swelling and loss of conductive contact between particles in the conductive layer. Note that such swelling and mass loss from the electrolyte could also cause other detrimental effects, including loss of ionic conductivity in the electrolyte, porosity in the electrolyte layer, particle release from the cathode into the electrolyte layer, and delamination of the electrolyte layer.

To solve the above problems, the ionic liquid and salt, or more generally any dissolved additive in the electrolyte, can also be included in the formulation of the adjacent electrodes or current collectors, thus suppressing diffusional losses from the electrolyte and preventing swelling of the electrodes and electrolytes.

Example embodiments balance the current IL+electrolyte salt doping level in the electrolyte with the PVDF HFP content in each of the layers. Formulations for the doping level in the electrodes (or collectors) may be such that the metal salt or ionic liquid concentration is lower than in the electrolyte (or electrode), but preferably, the electrode (or collector) doping level matches or exceeds the doping level in the electrolyte itself to block diffusion and perhaps to provide a source of dopant to the electrolyte layer. In cases where the active or conductive particles in the electrode or collector ink are impervious to the ionic dopants to be added, the doping level for the electrode or collector ink would be calculated factoring in only the ionic permeable parts of the electrode or collector. Impermeable materials and inclusions are essentially inert for the purpose of this calculation and do not represent a sink or source of dopants, except in instances where such materials or inclusions may be porous or of high surface area.

Example formulations of electrolytes and current collectors are given below in Tables 2 and 3. Molarities of ionic liquid and zinc salt (considering only the fraction of the volume that contains Ionic Liquid and zinc soluble materials) can vary from $10^{-1}$ M to 5M (for either component or a composite mixture).

TABLE 2

Example Electrolyte Formulations

| | Electrolyte | |
|---|---|---|
| | Formulation 1 | Formulation 2 |
| Zn Triflate (OTf) [g] | 1.125 | 2.9234 |
| BMIM OTf [g] | 8 | 8 |
| PVDF-HFP [g] | 8 | 8 |
| Zn OTf [wt %] | 0.066 | 0.171 |
| BMIM OTf [wt %] | 0.467 | 0.467 |
| PVDF-HFP [wt %] | 0.467 | 0.467 |
| Zn OTf [vol %] | 2.3% | 5.8% |
| BMIM OTf [vol %] | 56.9% | 54.9% |
| PVDF-HFP [vol %] | 40.8% | 39.3% |
| Zn OTf [M] | 2.8E−01 | 7.1E−01 |
| BMIM OTf [M] | 2.5459 | 2.4545 |

Note that the electrolyte examples here represent one case. Advantageous formulations could also contain solvents, polymers and other additives which may replace the ionics content or the PVDF-HFP. Current collector formulations are generally based on ~70% conductor loading by volume, but lower percentages may also be possible, as well as composites of different metals, carbon, graphites, CNT, graphene, etc., to create a robust and effective conductor. The same calculations can also be done for a simple anode, such as a Zn powder-based printed anode layer, using the densities of Zn and appropriate binders and/or additives. A similar calculation can be performed for the cathode, substituting, for example, the densities and molecular weights of $MnO_2$ and adding a set of fields and data for conductive additives, such as carbon AB and graphite, which can be used in cathode formulations. One feature of these formulation calculations is that they maintain the same concentrations of ionic species in the electrolyte and in other layers in the battery.

TABLE 3

Example Current Collector Formulations

|  | Current Collector | |
| --- | --- | --- |
|  | Formulation 1 | Formulation 2 |
| Zn OTf [g] | 1.125 | 2.9234 |
| BMIM OTf [g] | 8 | 8 |
| PVDF-HFP [g] | 8 | 8 |
| Nickel [g] | 198 | 206 |
| Zn OTf [wt %] | 0.005 | 0.171 |
| BMIM OTf [wt %] | 0.037 | 0.467 |
| PVDF-HFP [wt %] | 0.037 | 0.467 |
| Nickel [wt %] | 0.920 | 0.958 |
| Zn OTf [vol %] | 0.007 | 0.017 |
| BMIM OTf [vol %] | 0.171 | 0.164 |
| PVDF-HFP [vol %] | 0.122 | 0.118 |
| Nickel [vol %] | 0.700 | 0.700 |

Example polymers that have a finite solubility for ionic, electrolytic, solvating or ion transport-enhancing species in the electrolytes, electrode binders and collector binders include: polyvinylidene fluoride and its copolymers, polyanilines, polyethers, polyethylene oxides, polyimides, polyacrylates, polyacrylic copolymers, polyesters, polyester copolymers, polyvinylidene chlorides, etc.

Example mobile ionic species that may be in electrolytes and that can diffuse out include cation and anion combinations including the cations: imidazolium, pyrolidinium, tetraalkyl amines, Li, Zn, Na, Al, and Mg, the anions: trifluoromethane-sulfonate (triflate), bis((trifluoromethyl)sulfonyl)imide (triflate sulfimide, or TFSI), hexafluorophosphate, borate, and cation-anion pairs such as ionic liquids and metal salts. Specific mobile ionic species include compounds such as:
1-butyl-3-methylimidazolium trifluoromethanesulfonate,
1-butyl-3-methylimidazolium bis((trifluoromethyl)sulfonyl)imide,
1-butyl-3-methylimidazolium hexafluorophosphate,
1-butyl-3-methylimidazolium bis((trifluoromethyl)sulfonyl)amide, and
1-butyl-3-methylimidazolium tetrafluoroborate;
1-Butyl-2,3-dimethyllimidazolium trifluoromethanesulfonate,
1-Butyl-2,3-dimethyllimidazolium bis((trifluoromethyl)sulfonyl)imide,
1-Butyl-2,3-dimethyllimidazolium hexafluorophosphate,
1-Butyl-2,3-dimethyllimidazolium bis((trifluoromethyl)sulfonyl)amide, and
1-Butyl-2,3-dimethyllimidazolium tetrafluoroborate;
1-butyl-1-methylpyrrolidinium trifluoromethanesulfonate,
1-butyl-1-methylpyrrolidinium bis((trifluoromethyl)sulfonyl)imide,
1-butyl-1-methylpyrrolidinium hexafluorophosphate,
1-butyl-1-methylpyrrolidinium bis((trifluoromethyl)sulfonyl)amide, and
1-butyl-1-methylpyrrolidinium tetrafluoroborate;
1-butyl-1-methylpyridinium trifluoromethanesulfonate,
1-butyl-1-methylpyridinium bis((trifluoromethyl)sulfonyl)imide,
1-butyl-1-methylpyridinium hexafluorophosphate,
1-butyl-1-methylpyridinium bis((trifluoromethyl)sulfonyl)amide, and
1-butyl-1-methylpyridinium tetrafluoroborate;
1-Ethyl-1-methylpyrrolidinium trifluoromethanesulfonate,
1-Ethyl-1-methylpyrrolidinium bis((trifluoromethyl)sulfonyl)imide,
1-Ethyl-1-methylpyrrolidinium hexafluorophosphate,
1-Ethyl-1-methylpyrrolidinium bis((trifluoromethyl)sulfonyl)amide, and
1-Ethyl-1-methylpyrrolidinium tetrafluoroborate;
1-Ethyl-3-methylimidazolium trifluoromethanesulfonate,
1-Ethyl-3-methylimidazolium bis ((trifluoromethyl)sulfonyl)imide,
1-Ethyl-3-methylimidazolium hexafluorophosphate,
1-Ethyl-3-methylimidazolium bis((trifluoromethyl)sulfonyl)amide, and
1-Ethyl-3-methylimidazolium tetrafluoroborate;
1-methyl-1-propylpyrroldinium trifluoromethanesulfonate,
1-methyl-1-propylpyrroldinium bis((trifluoromethyl)sulfonyl)imide,
1-methyl-1-propylpyrroldinium bis(trifluoromethylsulfonyl)amide,
1-methyl-1-propylpyrroldinium hexafluorophosphate, and
1-methyl-1-propylpyrroldinium tetrafluoroborate; and
zinc bis((trifluoromethyl)sulfonyl)imide,
zinc trifluoromethanesulfonate,
zinc bis((trifluoromethyl)sulfonyl)amide,
zinc tetrafluoroborate,
zinc hexafluorophosphate,
zinc nitrate, and
zinc chloride.

Example solvating or ion transport-enhancing species that may be present in the electrolyte or electrodes and that may diffuse out include materials and/or solvents such as: carbonates such as ethylene carbonate and propylene carbonate, glycols such as ethylene glycol, diethylene glycol, polyethylene glycols, propylene glycol and oligomers thereof, ethylene oxides, propylene oxides, polymers and copolymers of ethylene and propylene oxides, ethers, fluorinated carbonates, fluorinated ethers, and block copolymers of the previously listed (polymerizable) materials. Other high boiling point solvents (including polar solvents having a boiling point at 1 atm of >150° C., >200° C., or >250° C.), can also be included.

Example electrode compositions to which dopants can be added: metal oxides such as $MnO_2$, vanadium oxide, metal cobalt oxides, ternary oxides, etc., plus one or more polymers (e.g., as a binder, ionic vehicle, or electronic conductor).

The present formulations may also be used with solid inorganic electrolytes, combined with semipermeable or ionic soluble electrode or collector compositions.

Experiments with Ionic Liquid Doping of Electrodes

Increasing electrolyte concentration and electrolyte conductivity, and in some cases, electrode ionic conductivity and suppression of outdiffusion of ionic electrolyte components into adjacent layers in a layered battery cell structure is of particular interest when the adjacent electrode and current collector layers may contain regions which have some solubility or provide a mobile path for diffusion or drift of ionic species into these layers that can ultimately reduce the ionic conductivity and performance of the cell. An example system where this occurs is a cell based on a polymer electrolyte that contains one or more mobile ionic species such as an ionic liquid, a metal salt, an organic salt, a solvent, and/or an ionic complexing agent. When such electrolyte layers are surrounded by electrode or current collector layers that contain materials that a have a finite solubility for the ionic or solvating species in the electrolyte, these species and/or materials can diffuse into the other layers. Materials that have a finite solubility for these species and/or materials include active materials and binder materials such as polymers.

In the following example, printed electrolyte, printed cathode, and printed current collector cells with undoped cathodes and doped cathodes of various doping levels were compared in terms of their capacity fade during cycling (which may also include an element of time fading of capacity as cycling takes a finite amount of time). Electrolyte formulations were based on 1-butyl-3-methylimidazolium trifluoromethane-sulfonate, zinc trifluoromethanesulfonate, and PVDF-HFP (following WO12037171). Cathode formulations were as described in Table 4 below. In this example, the current collector was not doped and contained only carbon and PVDF-HFP.

TABLE 4

Cathode formulations in Top Cathode Architecture Experiment

| $MnO_2$ vendor | Acros $MnO_2$ ($MnO_2$ dominated) - see S0033; no IL/salt | Acros - 5% IL | Acros - 10% IL | Acros - 15% IL |
|---|---|---|---|---|
| Density $MnO_2$ | 5 | 5 | 5 | 5 |
| $MnO_2$ Volume % | 83.49 | 78.65 | 74.34 | 70.48 |
| PVDF Volume % | 8.93 | 8.42 | 7.96 | 7.54 |
| Carbon Volume % | 7.57 | 7.13 | 6.74 | 6.39 |
| IL/salt volume % | 0.00 | 5.80 | 10.96 | 15.59 |
| $MnO_2$ weight (g) | 26.25 | 26.25 | 26.25 | 26.25 |
| PVDF weight (g) | 1 | 1 | 1 | 1 |
| Carbon weight (g) | 1 | 1 | 1 | 1 |
| NMP (g) | 25 | 25 | 25 | 25 |
| Weight of IL/salt | 0 | 0.5 | 1 | 1.5 |

All cell layers were printed by stencil printing with a 1 $cm^2$ active area, and dried in a convection oven (air). Devices were cycle tested in open air with an Arbin battery test system at 30 uA/$cm^2$ discharge current density between 1.8V and 0.6V. Cycling results showed a decrease in cycle fade for the samples with electrolyte doping in the reduction in percentage cycle fade (e.g., the relative discharge capacity from cycle 1 to cycle 2, and from cycle 1 to cycle 3). A trend of reduced early discharge capacity face can be seen through the sample series 9042_100 through 9042_400, which goes from no cathode doping (the control sample set 9042_100) through increasing doping levels as described in Table 5. This can be attributed to the reduced redistribution and diffusion of ionic liquid and or metal salt from the electrolyte into the cathode (no doping for 9042_100). Reduced % capacity loss with cycling was observed for the more heavily doped cathodes A Further Example of Printed Battery Structure(s) Using the Invention Printed battery structures including printed cathodes and, in some cases, printed anode structures were produced that demonstrate the positive effects of doping in cathode and anode structures as compared to undoped controls. The electrolyte chemistry followed WO12037171 in general makeup, except that the ionic liquid used was 1-ethyl-3-methylimidazolium bis(trifluoromethylsulfonyl)imide (EMIM TFSI) and the Zn salt used was zinc(II) bis(trifluoromethanesulfonyl)imide (Zn TFSI). The ionic liquid and electrolyte salt ratios relative to the PVDF-HFP content in the electrolyte were the same as the ratios of ionic liquid and electrolyte salt to PVDF-HFP content in the electrodes, as described in Table 5.

TABLE 5

Experimental Variations:

| | | Sample Series Names | | | |
|---|---|---|---|---|---|
| | | 100 Series | 200 Series | 300 Series | 400 Series |
| Cell Stack Descriptions | | Base Cathode on Zn Foil Substrate Anode | Doped Cathode on Zn Foil Substrate Anode | Base Cathode and Anode on Stainless Steel | Doped Cathode and Doped Anode on Stainless Steel |
| Substrate | | High Purity Zn - Front Grid | High Purity Zn - Front Grid | Stainless Steel | Stainless Steel |
| Printed Anode | Ink | | | Undoped Zn Ink Z0002 | Doped Zn Ink Z0003 |
| Printed Anode | Process | | | Stencil | Stencil |
| Printed Electrolyte | Ink | EMIM:TFSI | EMIM:TFSI | EMIM:TFSI | EMIM:TFSI |
| Printed Electrolyte | Process | Stencil | Stencil | Stencil | Stencil |
| Printed Cathode | Ink | Undoped Cathode Ink M0005 | Doped Cathode Ink M0004 | Undoped Cathode Ink M0005 | Doped Cathode Ink M0004 |
| Printed Cathode | Process | Stencil | Stencil | Stencil | Stencil |
| Printed Top Current Collector | Ink | C0002 | C0002 | C0002 | C0002 |
| Printed Top Current Collector | Process | Stencil | Stencil | Stencil | Stencil |

The electrode ink formulations included (all values in grams):

| | PVDF | NMP | $MnO_2$ | CARBON | IL + Zn Salt |
|---|---|---|---|---|---|
| M0004 | 2.005 | 33.333 | 52.533 | 2.006 | 3.133 |
| M0005 | 6.027 | 100.6 | 157.8 | 6.03 | 0 |

| | PVDF | NMP | Zn | | IL + Zn Salt |
|---|---|---|---|---|---|
| Z0002 | 7.12* | 28.98 | 89.76 | 0 | 0 |
| Z0003 | 2.373 | 9.66 | 29.92 | 0 | 3.71 |

Results (Using Arbin Battery Test System)

Figure 10A:
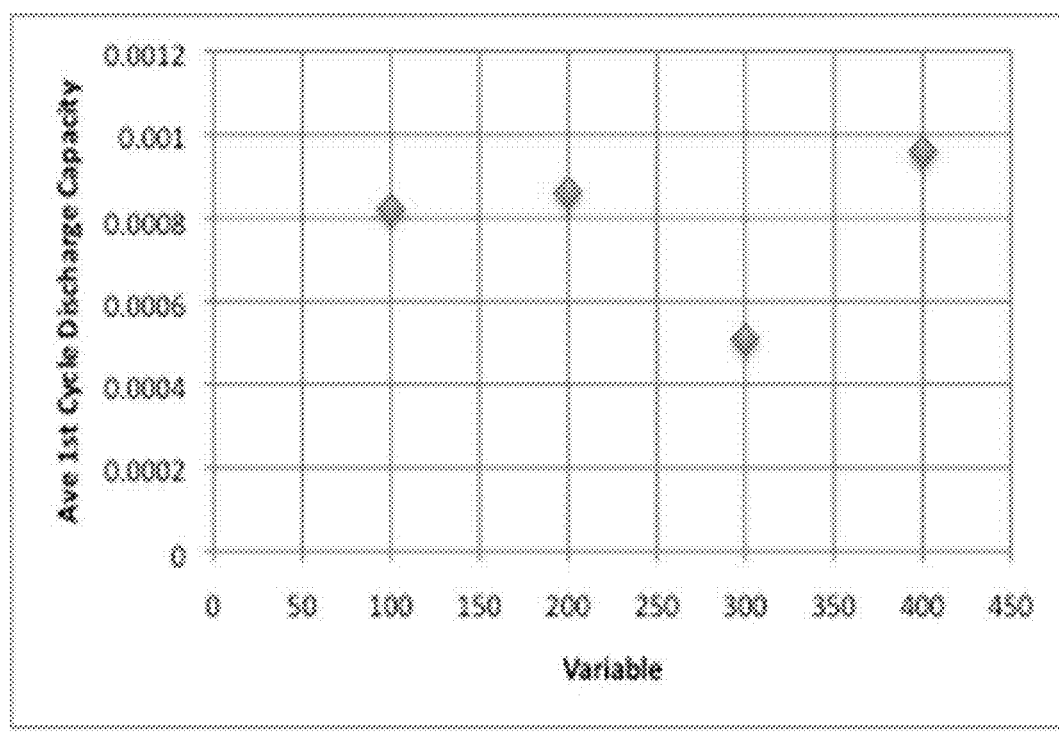
FIGS. 10(A)-(B) are graphs showing the first cycle discharge capacity (FIG. 10(A)) and the third cycle discharge capacity (FIG. 10(B)) at 300 uA constant current for the experimental variants listed in Table 6 below. Cells were charged at 300 uA current to 1.8V, and then held potentiostatically at 1.8V until the cell current dropped below 50 uA prior to discharge.
Figure 10B:
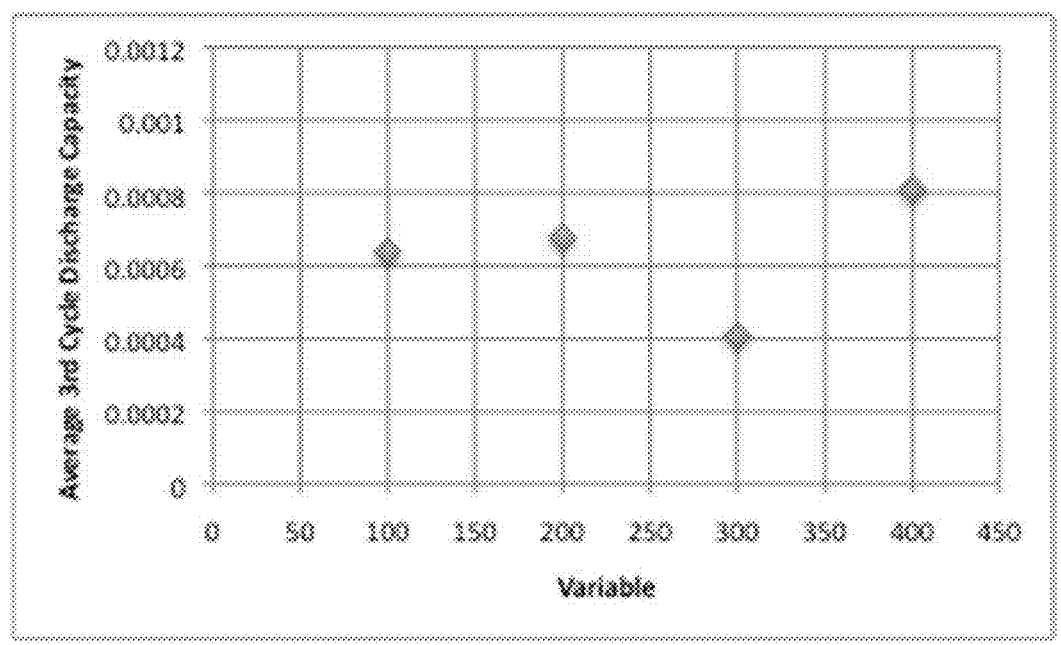
Figure 11:
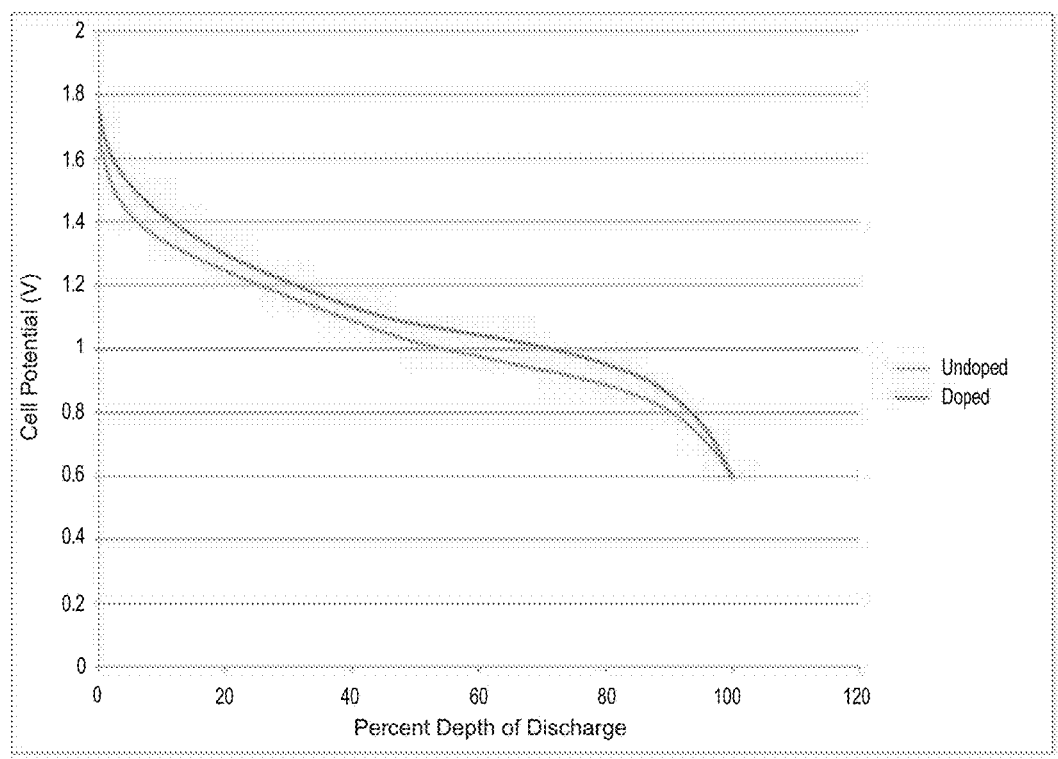
FIG. 11 is a graph showing discharge voltage curves with higher average voltages for the Series 400 doped anode and doped cathode cell (9125_0401_0005_0002) versus the Series 300 undoped cell (9125_0301_0004_0002).

As can be seen in FIG. 10, the doping of the electrodes increased the discharge capacity of the cells. Comparing series 200 to series 100 shows the impact of cathode doping on discharge capacity for cells with foil anodes. An increase in capacity was observed for the doped cathode case. Series 400 versus 300 compares cells with doped printed cathode and doped printed anodes to cells with undoped printed cathode and undoped printed anodes. In this case a large performance increase was seen. The fact that the undoped printed anode cells (Series 300) versus the foil anode controls (Series 100) were lower is possibly due to loss of ionic liquid or metal salt form the electrolyte layer into the binder of the undoped anode leading to depletion of ionic species in the electrolyte layer and reduced ionic conductivity. A higher average voltage throughout the discharge can also be seen in the Series 400 cell versus the Series 300 cell.

Figure 12:
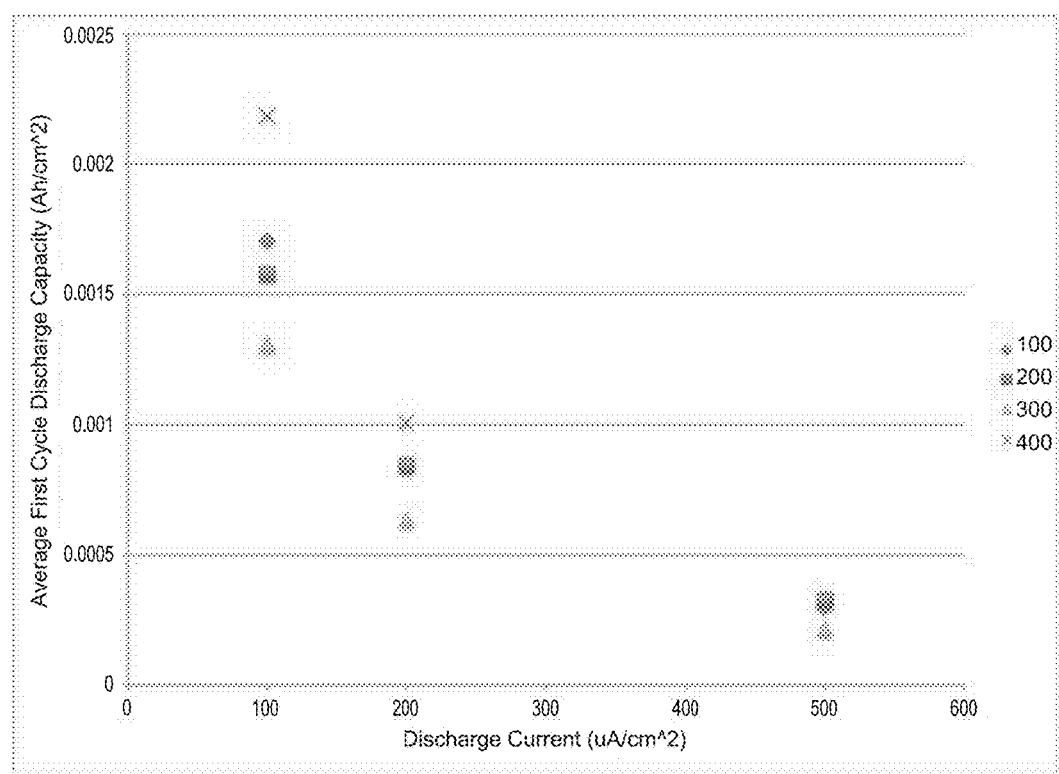
FIG. 12 is a plot of discharge capacity versus discharge current for sets of cells from the experiment(s) described in Table 5 below.

Referring to FIG. 12, looking at discharge capacity over a range of discharge currents for sets of cells from the above experiment supports the overall trend for improved performance from cells having one or more doped electrodes versus cells having otherwise identical undoped electrodes. At lower currents, the improved performance of the doped electrodes is easily visible. At 500 uA/cm2 discharge currents, the data is more compressed, but the undoped anode and cathode still show the lowest performance.

Other Concepts and Inventive Ideas Related to this Invention

It is important to emphasize that this concept extends not only to electrodes, but also to current collectors, especially printed and coated current collectors. Few others have worked with printed current collectors. Likely, the concept of including electrolyte doping to prevent diffusion, swelling, and function loss into current collectors from the electrolyte and electrodes may be novel and useful, since printed conductors are typically metal particles in a matrix that may have a solubility and/or permeability for the electrolytic materials that should remain in the active regions of the battery. Also, since it is advantageous to dope the electrodes, there may be a problem of loss of those dopants to the next adjacent layer (i.e., the current collector). Typically, foil collectors are used in the battery industry.

Cross linking of the dopants in the binder networks of the electrodes and collectors can stabilize the motion of these materials, preventing them from transporting in or out of the cell, and thereby stabilizing their blocking effect on the outflow of ionic and solvating species from interior layer(s) in the cell (electrolyte or electrodes).

Use of polymer-tethered counter-ion metal salts in printed and/or solution deposition cells as a means to suppress outdiffusion of anions from the electrolyte layer, an electrode or a current collector.

Inclusion of pH modifiers in the electrodes and/or current collectors to protect those layers. It may be advantageous where a pH modifier, such as a low pH buffer or acidic additive (e.g., a carboxylic acid, fatty acid, etc.) can help protect or stabilize Zn ions or collector metals and suppress oxide formation and proton-based side reactions at one electrode or collector. However, that same modifier may be detrimental at another electrode or at another location within the cell. In this invention, the pH modifier is placed at a particular layer or interface in the cell. This can be achieved by incorporating it into an ink to be coated or printed for that particular layer, or exposing the cell at the right point in the process to a liquid diffusion source for the modifier or a vapor-based source to cause a local modification.

The present doping approach may be used in the case where there are blends of ionic species in the electrolytes, and the doped layers contain at least one component (up to all components) of that blend.

It may be advantageous for an ion transport-blocking layer to be doped with an ionic material that contains one ion (either cation or anion) that is also contained in the electrolytic layer, but that has a dissimilar counter ion.

In the case of a diffusion/redistribution-blocking layer doped with a dissimilar counter ion, when the dissimilar counter ion is a less mobile species, this can provide an anchoring effect, while maintaining the desired ion-blocking effect.

Also included within the scope of the present invention:
  The present doping approach can enhance ionic conductivity and electrolytic activity in the electrodes and/or current collectors, in addition to blocking redistribution of beneficial species from the electrolyte layer and/or electrode to the current collector.
  The present doping approach can enhance ionic conductivity and electrolytic activity in the electrodes, in addition to causing swelling in the electrodes or in a current collector (which may be printed).
  The present doping approach can enhance ionic conductivity and electrolytic activity in the electrodes, in addition to reducing or avoiding the risk of delamination of layers in a cell or cell battery stack due to swelling-induced stresses or the redistribution of species to the interface between cell layers and between cell and substrate or packaging layers. The presence of these species can compromise the mechanical and electrical bonding between battery layers.
  The concepts in this patent application can apply to anode and cathode layers, as well as their associated collectors.
  It may be advantageous for the dopant in the electrode or collector to contain an ionic material in which at least one of ions is common with the electrolyte or adjacent layer, while the other ion(s) in the electrolyte or adjacent layer are different, as this may provide a diffusional barrier for the common ion, but allow for other beneficial properties such as using immobile other ions in the electrode or current collector that could be less susceptible to redistribution and that may have other beneficial roles in the electrode or current collector. This may include polymer ions that also have desirable mechanical properties in the electrode(s) and/or current collector(s).

Doping the anode may suppress unwanted shape change or dendrite formation by regulating the IL and/or electrolyte salt concentration gradient at its interface with the electrolyte layer. Such shape change or dendrite formation can cause premature failure or non-homogenous utilization of the electrode. A regulated concentration gradient (or a lack of a concentration gradient) may affect and/or control the surface kinetics of reactions (e.g., electrodeposition, or electrochemical stripping of ions) at the anode surface.

Introduction and control of ionic species and their concentration profiles throughout the cell can be achieved through inclusion of the species in different layer formulations prior to deposition. However, they can also be introduced or controlled through the application of electric fields to drive motion/transport and the species distribution during cell fabrication, after fabrication, or during use. The magnitude of the electric fields that can be applied to the cell to drive motion/transport of ionic species along with their duration will affect the motion/transport of the ionic species and therefore dictate the distribution of these species through the cell and its layers. For example, a series of large electric field pulses, followed by a long duration of a low electric field, may allow more uniform concentration distributions of the ionic species through the cells and its layers.

External layers, including solid or liquid layers, can also be sources of the beneficial ionic, transport or additive species to redistribute into the active cell layers. These external layers could be provided by immersion, printing of additional layers, spraying, or lamination of a donor layer. This donor layer may form part of an encapsulation barrier film, protection film and/or adhesive layer. Example adhesives include acrylics, acrylic acids, polyethylenes, methacrylic acids, silicones, and hydroxyl-terminated silicones. Example buffer or packaging layer materials include polyimides, polyesters, polyvinyl alcohols, polyethylenes, fluorinated ethylenes, polyvinylidene fluorides, polyvinylidene chlorides, and ethylene vinyl alcohols.

What is claimed is:

1. An electrical or electrochemical cell, comprising:
a cathode layer, comprising a first material providing a cathodic electric or ionic transport, charge storage or redox function;
an electrolyte layer, comprising a first electrolyte salt and a first ionic liquid, and optionally, a polymer;
an anode layer, comprising a second material providing an anodic electric or ionic transport, charge storage or redox function;
a first current collector layer in contact with the cathode layer, comprising a first conductive material; and
a second current collector layer in contact with the anode layer, comprising a second conductive material;
wherein at least one of the first and second current collector layers further comprises at least one of a second ionic liquid and a second electrolyte salt, the second ionic liquid is identical to or different from the first ionic liquid, the second electrolyte salt is identical to or different from the first electrolyte salt, and the second conductive material is identical to or different from the first conductive material.

2. The electrical or electrochemical cell of claim 1, wherein the first current collector layer comprises the second ionic liquid and optionally the second electrolyte salt, the second current collector layer further comprises a third ionic liquid and optionally a third electrolyte salt, the third ionic liquid is identical to or different from the first and/or second ionic liquids, and the third electrolyte salt is identical to or different from the first and/or second electrolyte salts.

3. The electrical or electrochemical cell of claim 2, wherein the cathode layer further comprises at least one of a fourth ionic liquid and a fourth electrolyte salt, the anode layer further comprises at least one of a fifth ionic liquid and a fifth electrolyte salt, the fourth ionic liquid is identical to or different from the first, second and/or third ionic liquids, the fifth ionic liquid is identical to or different from the first, second, third and/or fourth ionic liquids, the fourth electrolyte salt is identical to or different from the first, second and/or third electrolyte salts, and the fifth electrolyte salt is identical to or different from the first, second, third and/or fourth electrolyte salts.

4. The electrical or electrochemical cell of claim 3, wherein the first current collector layer comprises the second ionic liquid and the second electrolyte salt, the second current collector layer comprises the third ionic liquid and the third electrolyte salt, the cathode layer comprises the fourth ionic liquid and the fourth electrolyte salt, the anode layer comprises the fifth ionic liquid and the fifth electrolyte salt, and the first, second, third, fourth and fifth electrolyte salts, each each have a common cation or anion.

5. The electrical or electrochemical cell of claim 3, wherein the cathode layer contains the fourth ionic liquid and/or the fourth electrolyte salt, the electrolyte layer contains the first ionic liquid and/or the first electrolyte salt, and the anode layer contains the fifth ionic liquid and/or the fifth electrolyte salt, each in a concentration that is substantially at or near a saturation concentration.

6. The electrical or electrochemical cell of claim 3, wherein (i) the cathode layer contains the fourth ionic liquid and/or the fourth electrolyte salt in substantially a same concentration as the first ionic liquid and/or the first electrolyte salt, respectively, in the electrolyte layer, and (ii) the anode layer contains the fifth ionic liquid and/or the fifth electrolyte salt in substantially the same concentration as the first ionic liquid and/or the first electrolyte salt, respectively, in the electrolyte layer, each based on a first ratio of the first ionic liquid to ionic liquid-permeable components of the electrolyte layer and/or a second ratio of the first electrolyte salt to electrolyte salt-permeable components of the electrolyte layer.

7. The electrical or electrochemical cell of claim 6, wherein the first current collector layer contains the second ionic liquid and/or the second electrolyte salt, and/or the second current collector layer contains the third ionic liquid and/or the third electrolyte salt, in substantially a same concentration as an adjacent layer contains its corresponding ionic liquid and/or electrolyte salt, respectively based on a third ratio of the second ionic liquid to ionic liquid-permeable components of the first current collector layer and the corresponding ionic liquid to ionic liquid-permeable components of the adjacent layer, and/or a fourth ratio of the third electrolyte salt to electrolyte salt-permeable components of the second current collector layer and the corresponding electrolyte salt to electrolyte salt-permeable components of the adjacent layer.

8. The electrical or electrochemical cell of claim 2, wherein the first current collector layer contains the second ionic liquid, the electrolyte layer contains the first ionic liquid, and the second current collector layer contains the third ionic liquid in a molarity of 0.1 M to 5 M.

9. The electrical or electrochemical cell of claim 2, wherein the first current collector layer contains the second ionic liquid and optionally the second electrolyte salt, and the second current collector layer contains the third ionic liquid and optionally the third electrolyte salt, each in a concentration that is substantially at or near a saturation concentration.

10. The electrical or electrochemical cell of claim 1, wherein each of the first and second ionic liquids independently comprises an identical or different imidazolium salt, pyrrolidinium salt, ammonium salt, pyridinium salt, piperidinium salt, phosphonium salt, or sulfonium salt that is a liquid at ambient or room temperature.

11. The electrical or electrochemical cell of claim 1, wherein each of the first and second electrolyte salts releases (i) cations selected from the group consisting of zinc ions, aluminum ions, magnesium ions, and yttrium ions, and (ii) anions selected from the group consisting of chloride, tetrafluoroborate (BFl), trifluoroacetate ($CF_3CO_2^-$), trifluoromethanesulfonate ($CF_3SO_3^-$), hexafluorophosphate ($PF_6^-$), bis(trifluoromethylsulfonyl)amide ($NTf_2^-$), and bis(fluorosulfonyl)imide ($N(SO_2F)_2)^-$.

12. The electrical or electrochemical cell of claim 1, wherein the electrolyte layer further comprises the polymer.

13. The electrical or electrochemical cell of claim 1, wherein the electrolyte layer transports multivalent ions.

14. The electrical or electrochemical cell of claim 1, wherein the second conductive material is identical to the first conductive material.

15. The electrical or electrochemical cell of claim 3, wherein the cathode layer contains the fourth ionic liquid, the anode layer contains the fifth ionic liquid, and the fourth and fifth ionic liquids are identical to the first ionic liquid.

16. The electrical or electrochemical cell of claim 2, wherein the first current collector layer further comprises the second ionic liquid and the second electrolyte salt, and the second current collector layer further comprises the third ionic liquid and the third electrolyte salt.

17. The electrical or electrochemical cell of claim 11, wherein each of the first and second ionic liquids independently comprises an imidazolium salt, pyrrolidinium salt, ammonium salt, pyridinium salt, piperidinium salt, phosphonium salt, or sulfonium salt that is a liquid at ambient or room temperature.

18. The electrical or electrochemical cell of claim 3, wherein the cathode layer contains the fourth ionic liquid, and the anode layer contains the fifth ionic liquid.

19. The electrical or electrochemical cell of claim 18, wherein each of the first ionic liquid, the second ionic liquid, the third ionic liquid, the fourth ionic liquid and the fifth ionic liquid is identical to the others of the first to fifth ionic liquids.

20. The electrical or electrochemical cell of claim 1, wherein each of the first and second electrolyte salts releases $Zn^{2+}$.

21. The electrical or electrochemical cell of claim 4, wherein each of the first and second electrolyte salts releases $Zn^{2+}$.

22. The electrical or electrochemical cell of claim 11, wherein each of the first and second electrolyte salts releases $Zn^{2+}$.

23. The electrical or electrochemical cell of claim 3, wherein the first current collector layer comprises the second ionic liquid and the second electrolyte salt, the second current collector layer comprises the third ionic liquid and the third electrolyte salt, the cathode layer comprises the fourth ionic liquid and the fourth electrolyte salt, the anode layer comprises the fifth ionic liquid and the fifth electrolyte salt, and the first, second, third, fourth and fifth electrolyte salts.

\* \* \* \* \*